United States Patent [19]

Crossman

[11] Patent Number: 4,567,967
[45] Date of Patent: Feb. 4, 1986

[54] ELECTRICALLY ACTUATED AIRCRAFT BRAKES

[75] Inventor: Richard L. Crossman, Tallmadge, Ohio

[73] Assignee: Goodyear Aerospace Corporation, Akron, Ohio

[21] Appl. No.: 608,041

[22] Filed: Dec. 15, 1983

Related U.S. Application Data

[62] Division of Ser. No. 347,851, Feb. 11, 1982, Pat. No. 4,432,440, which is a division of Ser. No. 62,199, Jul. 30, 1979, Pat. No. 4,381,049.

[51] Int. Cl.$^4$ .................... B60L 7/00; F16D 55/02
[52] U.S. Cl. .................... 188/72.3; 188/71.8; 188/72.8; 188/161; 188/265
[58] Field of Search ............ 188/72.7, 72.8, 72.3, 188/72.1, 71.2, 71.8, 71.5, 71.9, 196, 158–165, 265, 31, 69, 216; 192/70.21, 70.11, 70.16, 94, 93, 84, 111 A; 74/112, 424.8 R, 499; 303/89

[56] References Cited

U.S. PATENT DOCUMENTS

| | | | |
|---|---|---|---|
| 3,235,045 | 2/1966 | Pop | 188/162 X |
| 3,419,118 | 12/1968 | Allaben, Jr. | 192/94 X |
| 4,381,049 | 4/1983 | Crossman | 188/72.7 |
| 4,432,440 | 2/1984 | Crossman | 188/71.2 |

Primary Examiner—Douglas C. Butler
Attorney, Agent, or Firm—P. E. Milliken; L. A. Germain; R. L. Weber

[57] ABSTRACT

Apparatus for electrically controlling the application and release of aircraft brakes. In one embodiment, the invention includes a slurry clutch controlling a reciprocating member which is operatively connected to the pressure plate. In another embodiment of the invention, a torque motor is adapted to have an armature which comprises a ball screw, the ball screw being in engagement with a longitudinal drive rod interconnected with the pressure plate. Rotation of the armature causes the drive rod to move the pressure plate into forceful engagement with the brake disk stack or to retract the same. In yet another embodiment of the invention, a plurality of torque motors are interconnected with a bull gear which is operative for driving the pressure plate. Each of the embodiments of the invention includes apparatus for maintaining a fixed built-in clearance in the brake disk stack of the brake assembly, and are further adapted for utilization with antiskid systems by utilizing a device connected to the pressure plate which allows rapid release of brake torque. Additionally, apparatus is provided which allows a locking of the brake assembly while the aircraft is parked.

8 Claims, 4 Drawing Figures

ELECTRICALLY ACTUATED AIRCRAFT BRAKES

This is a divisional application of application Ser. No. 347,851, filed Feb. 11, 1982, now U.S. Pat. No. 4,432,440 which was a divisional application of Ser. No. 062,199, filed July 30, 1979, now U.S. Pat. No. 4,381,049.

BACKGROUND OF THE INVENTION

The instant invention resides in the art of braking systems and, more particularly, deals with such systems for aircraft. Present day aircraft utilize a brake disk stack comprised of a plurality of brake disks alternately splined to either a torque tube or the wheel rim. The pressure plate, by actuation of the brakes, forces the disks into frictional contacting engagement with each other to effectuate the braking effort. While the invention herein will be described with respect to such brake assemblies, it will be understood that the apparata and techniques of the invention are not necessarily limited to such structure.

The invention herein relates specifically to brake assemblies for aircraft wherein actuation of the brake is achieved by electrical and electromechanical control. The embodiments herein will be described with respect to the control mechanisms only and do not elaborate upon the means by which the pilot or user may apply the control signal to the described assembly. It is presented that the art has previously taught a spring-biased brake pedal operating a rheostat or other variable resistive means to generate a signal of amplitude proportional to brake pedal travel and that such signals could be easily adapted for utilization in the embodiments herein. Accordingly, with the cockpit circuitry being readily conceivable and implemented by those skilled in the art, this application is not burdened with discussions relative thereto.

Heretofore in the aircraft industry, it has been found that the greatest percentage of maintenance efforts and repairs are with respect to the hydraulic systems of the aircraft. At this same time, electrical systems have been found to require very little maintenance or repair and to be of a nature which may be quickly and easily tested. Further, while it is complex and costly to provide redundant equipment in hydraulic systems to provide built-in safety factors, redundancy in electrical control circuitry is simple and relatively inexpensive to accomplish. Yet further, hydraulic systems add a great deal of weight to the aircraft, weight which could, if eliminated, allow for the carrying of additional cargo. While hydraulic systems are massive and weighty, electrical systems are substantially less cumbersome and much lighter.

ASPECTS OF THE INVENTION

In light of the foregoing, in accordance with one aspect of the invention, there is provided an electrically actuated aircraft brake wherein no hydraulic system is required.

In accordance with another aspect of the invention, there is provided an electrically actuated aircraft brake which is lightweight, substantially reducing the amount of weight in previously known hydraulic systems.

An additional aspect of the invention is the provision of an electrically actuated aircraft brake which includes apparatus for maintaining a constant built-in clearance between the pressure plate and the disks of the brake disk stack.

Yet another aspect of the invention is the provision of an electrically actuated aircraft brake which is readily adapted for implementation with presently existing braking systems incorporating antiskid circuitry.

Another aspect of the invention is the provision of an electrically actuated aircraft brake utilizing wheel rotation and torque to effectuate brake application.

Still a further aspect of the invention is the provision of an electrically actuated aircraft brake which is simplistic in design, reliable in operation, inexpensive to manufacture, and readily conducive to utilization of redundant circuits to achieve a desired safety factor.

SUMMARY OF THE INVENTION

Certain of the foregoing aspects and other aspects of the invention which will become apparent as the detailed description proceeds are provided by the improvement in a brake assembly having a brake disk stack and a pressure plate in communication therewith, comprising: reciprocating means connected to the pressure plate for selectively moving the pressure plate into and out of forceful contacting engagement with the brake disk stack; and electrically controlled rotation means operatively interconnected with said reciprocating means, regulated by an operator, for selective control of said reciprocating means and regulation of said forceful contacting engagement.

Other aspects of the invention are presented in a brake control assembly for incorporation with a pressure plate and a brake disk stack comprising: a rotating member operatively connected to a wheel rim and rotatable therewith; a nonrotating member operatively connected to the pressure plate; a metalized fluid maintained between said members; and electrically actuated coil means for selectively magnetizing said fluid and thereby imparting rotation of said rotating member to said nonrotating member.

Other aspects of the invention are provided by a brake control assembly for incorporation with a pressure plate in a brake disk stack, comprising: an armature; an electric coil rotationally driving said armature; and a drive rod in communication with said armature and connected to the pressure plate, energization of said electric coil moving said drive rod to move the pressure plate.

Yet other aspects of the invention are provided by a brake control assembly for reciprocating movement of a pressure plate, comprising: a torque motor; reciprocating means connected to the pressure plate for effectuating movement thereof; and drive means interconnected between said torque motor and said reciprocating means for driving said reciprorocating means.

DESCRIPTION OF DRAWINGS

For a complete understanding of the various aspects of the structures and techniques of the invention, reference should be had to the following detailed description and accompanying drawings wherein.

DETAILED DESCRIPTION OF PREFERRED EMBODIMENTS

Figure 1:
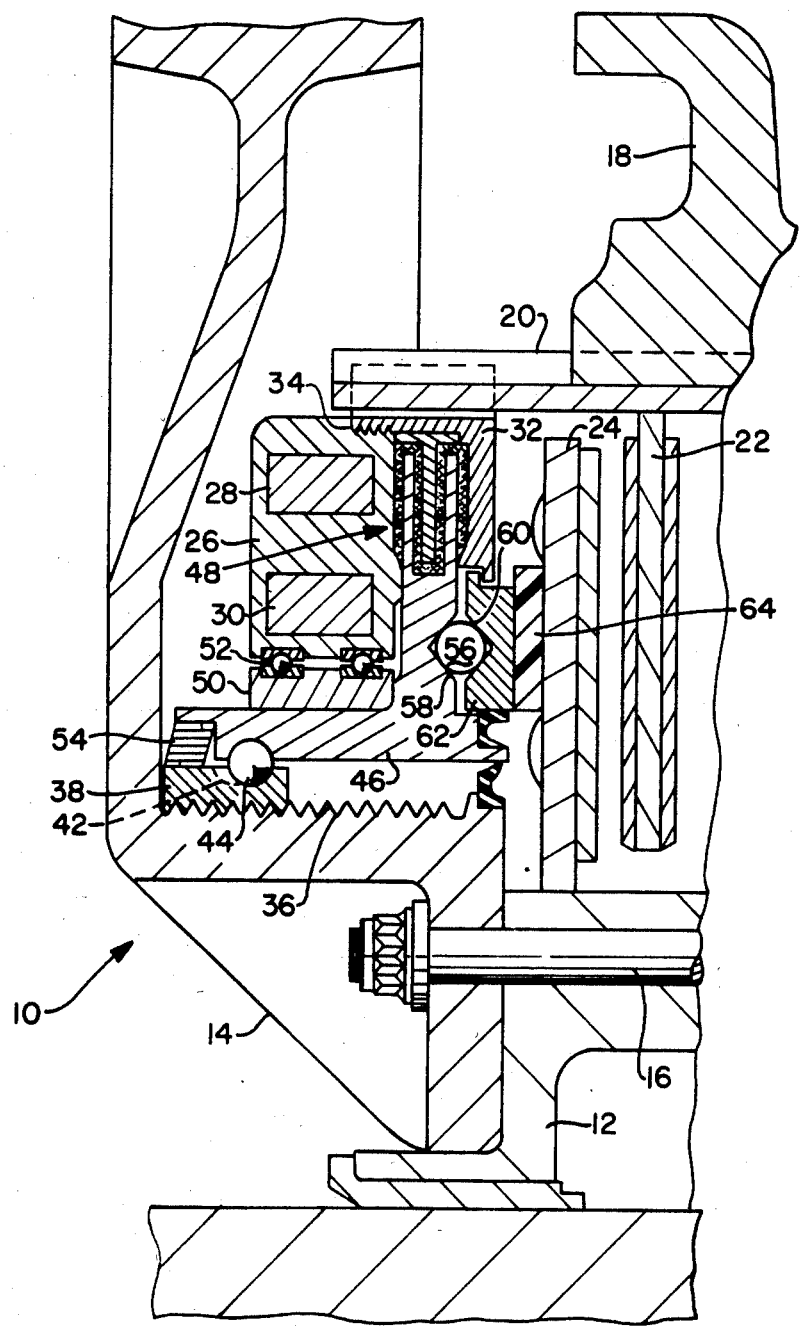
FIG. 1 is a partial sectional view of a brake assembly incorporating a first embodiment of the invention utilizing a slurry clutch.

Referring now to the drawings and more particularly to FIG. 1, it can be seen that a wheel assembly utilizing a first embodiment of the invention is designated generally by the numeral 10. A torque tube 12 is adapted for securing engagement with a brake housing 14 by means of bolts 16 or other fastener interconnected through a bore. It will be understood by those skilled in the art that the torque tube 12 is, in standard fashion, secured by such bolts to the axle of the aircraft wheel such that the structure 12,14 is stationary.

The wheel rim 18, receiving thereon a tire and rotatable about the axle, secures, by means of one or more keys 20, alternating brake disks 22 of a brake disk stack. As is well understood by those skilled in the art, the brake disk stack comprises a plurality of disks alternately splined or keyed to the torque tube 12 and wheel rim 18. There are thus provided alternate rotating and stationary disks in a brake disk stack which are brought into frictional contacting engagement with each other by means of a pressure plate 24.

Included as part and parcel of the invention is a coil housing 26 receiving therein electromagnetic coils 28,30. An end portion or cap 32 is keyed to the rim 18 by the key 20 and is threadedly engaged with the housing 26 as at 34. It will be appreciated that the threaded engagement 34 is for assembly purposes.

A way 36 is provided in the brake housing 14 for purposes which will become apparent hereinafter. A nut 38 is threaded into contacting engagement with the way 36. The nut 38 is characterized by a spiral groove 42 which receives therein a ball screw 44 which is in threaded engagement between the spiral groove 42 of the nut 38 and the clutch member 46. As shown, the clutch member 46 is slidingly received upon the way 36 and is movable thereupon as the ball screw 44 moves within the spiral groove 42.

The clutch member 46 has a flange extending upwardly as shown in the cross-section of FIG. 1 to form two ears receiving therein a center ear or ring depending from the end cap 32. These ears are encompassed by a metalized fluid, impregnated with iron or steel particles to form a slurry clutch designated generally by the numeral 48.

The housing 26 is mounted on a circumferential race member 50 maintained about the way 36. The race member 50 is fixedly secured to the way 36 and provides for rotation of the housing 26 with corresponding rotation of the center ear of the slurry clutch 48 by means of the ball bearings 52. It will be appreciated that a large plurality of such ball bearings 52 are provided about the race member 50 and the housing 26 and that such ball bearings are used as a commutator to achieve electrical communication with the coils 28,30. The utilization of the ball bearings 52 as a commutator is more fully discussed in applicant's U.S. Pat. No. 4,237,445. Suffice it to say that the ball bearings 52 allow the housing 26 and central ear of the slurry clutch 48 to rotate with the wheel rim 18 while allowing electrical contact to be made to the coils 28,30.

Interconnecting the clutch member 46 with the nut 38 is a spring 54 which may be a clock type flat coil spring of suitable material. As will be elaborated upon hereinafter, the clock spring 54 is biased to urge the return of the clutch member 46 upon the way 36 for brake release after movement thereof has been achieved via the ball screw 44 within the spiral groove 42 for brake application.

It will also be noted that a spherical thrust bearing 56 is received in circumferential grooves 58,60 respectively characterizing the clutch member 46 and thrust plate 62. Connected to the thrust plate 62 is a suitable insulator 64 which makes contacting engagement with the pressure plate 24.

In operation, the coils 28,30 are energized by a signal passed across the ball bearing commutator 52. The signal may be generated by brake pedal travel controlling a rheostat as discussed earlier herein. The energized coils produce a magnetic field which tends to magnetize the metalized fluid of the slurry clutch 48. Prior to such time, the slurry clutch was free-rotating, but with the magnetization of the fluid a drag builds up between the central rotating ear flange and the outer stationary ear flanges. There is thus created a slight rotation of the flange member 46 upon the way 36. It will be appreciated that, due to the spiral nature of the groove 42, the clutch member 46 moves both rotationally and longitudinally upon the way 36, forcing the pressure plate 24 into contacting engagement with the brake disk stack via the elements 56–64. In effect, it is wheel rotation and torque achieving the braking effort. This motion winds the clock spring 54 which, at brake release caused by a reduction in signal strength to the coils 28,30, results in slippage of the clutch 48. There is then a corresponding return of the clutch member 46, releasing pressure on the pressure plate. Upon total removal of the brake application signal, the clock spring 54 brings the ball screw 44 to the starting point of the spiral groove 42, where it remains until the next brake application.

The length of the spiral groove 42 is designed in accordance with the built-in clearance desired between the brake disk stack and the pressure plate. In other words, frictional braking engagement between the disks of the brake disk stack and the pressure plate is achieved at the end of travel of the ball screw 44 within the groove 42. The return of the ball 44 in the groove 42 when brake application is terminated thus reestablishes the built-in clearance. It will be appreciated, however, that as the disks 22 of the brake disk stack wear, there needs to be a new starting point for movement of the clutch member 46 such that constant built-in clearance is maintained. For this reason, the nut 38 is provided. When the ball screw 44 reaches the end of the spiral groove 42, the frictional engagement of the slurry clutch 48 will tend to rotate the nut 38 until braking engagement is made in the brake disk stack. This moves the nut 38 forward such that, on the next brake application, the clutch member 46 has a new starting point, maintaining the same built-in clearance as is characterized by the length of the spiral groove 42. Accordingly, compensation is made for wear in the brake disk stack and optimum use of the disks commensurate with safe operation of the aircraft is achieved.

Figure 2:
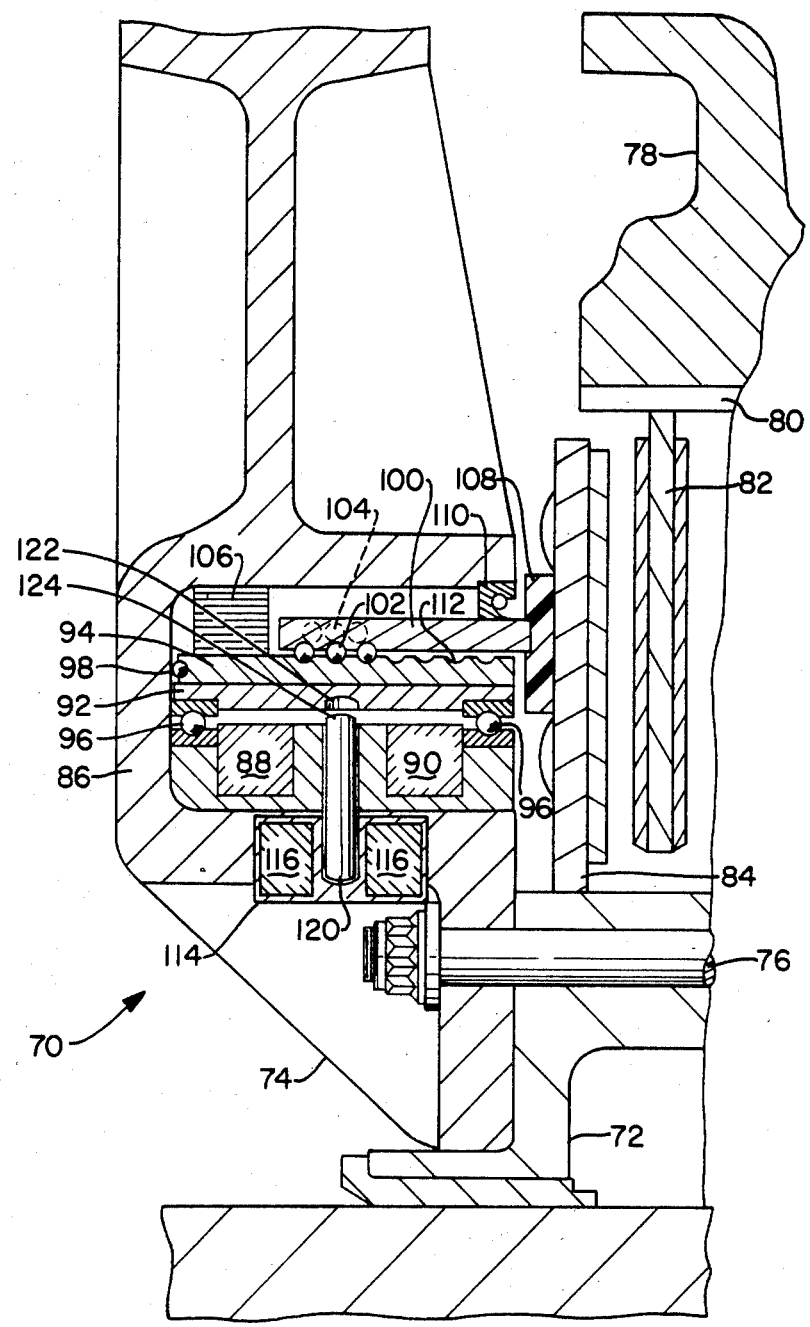
FIG. 2 is a partial sectional view of the brake assembly incorporating a second embodiment of the invention utilizing a torque motor for driving a drive rod.

With reference now to FIG. 2, it can be seen that a wheel assembly utilizing the second embodiment of the invention is designated generally by the numeral 70. Again, a torque tube 72 and brake housing 74 are adapted for interconnection by means of bolts 76. The torque tube 72 is interconnected to the axle of the wheel such that the same is stationary. A wheel rim 78 is provided with brake disks 82 keyed thereto by means of the keys 80, with it being understood that alternate disks are splined or keyed to the torque tube 72. A pressure plate 84 is provided in standard fashion to make the forceful frictional engagement between the various disks of the brake disk stack.

Affixed to the brake housing 74 is a housing 86 maintaining therein coils 88,90 which communicate with a magnet 92. Affixed to the magnet 92 is a ball screw 94, with the magnet 92 and ball screw 94 jointly comprising an armature which is rotatably mounted upon ball bearings 96 and driven by the coils 88,90. A thrust bearing 98 is provided as shown for purposes of keeping the armature 92,94 aligned. It will be appreciated by those skilled in the art that the elements 86–98 comprise a torque motor.

A drive rod 100 communicates via ball bearings 102 with the ball screw 94. The passage 104 is provided in the drive rod 100 to move the last of the three balls from an end groove to the next forward groove in the ball screw 94 as the drive rod 100 moves longitudinally with rotational movement of the armature 98. This extensive longitudinal movement will occur during brake wear adjustment which will be discussed hereinafter.

Interconnected between the brake housing 74 and the armature 92,94 is a return spring 106 which, again, may be of the clock spring nature. The spring 106 is fixedly connected to the housing 74 while being connected by means of a slip joint to the ball screw 94. The slip joint is provided to maintain a built-in clearance while providing for brake wear adjustment. As will become apparent hereinafter, the friction slip joint has ratchetlike teeth thereon sufficient to return the ball screw 94 a distance equivalent to the built-in clearance while slipping beyond that amount. Any travel of the ball screw 94 beyond that returned by the spring 106 is for brake wear adjustment or compensation.

An insulator 108 is provided for interconnection with the drive rod 100 for making contacting engagement with the pressure plate 84 in the manner discussed directly below.

In operation, pilot actuation of the brake pedal provides a signal to the coils 88,90 to energize the same. Energization of these coils rotates the armature 92,94 to cause the drive rod 100 to longitudinally move via the balls 102. This movement forces the pressure plate 84 into the brake disk stack. The spring 106 is then tensioned during the distance of travel of the ball screw 94 equivalent to the built-in clearance. Beyond that movement, the spring 106 slips at the friction slip joint. Movement beyond that point of the drive rod 100 is for brake wear compensation and, during the life of the brake disk stack, the rod 100 will longitudinally move along the ball screw 94 with the balls 102 passing through the passage 104 in the drive rod 100 into subsequently further advanced groove 112. It should also be noted that a guide seal 110 is provided to keep the drive rod 100 suitably aligned and sealed against contamination.

Upon release or reduction of brake pressure, the spring 106 returns the ball screw 94 a distance equivalent to the built-in clearance with the positional relationship between the ball screw 94 and the drive rod 100 being determined by the amount of wear experienced to date in the brake disk stack.

While a spring 106 has been provided with a slip joint to accommodate the built-in clearance, it will be understood by those skilled in the art that a reverse drive via the coils 88,90 of the armature 92,94 for a fixed duration could achieve maintenance of built-in clearance while achieving brake wear adjustment.

Included as part and parcel of the system of FIG. 2 is a parking brake comprising a housing 114 receiving therein a coil 116. The coil cooperates with a plunger 120 to operate as a solenoid. The solenoid plunger 120 has teeth 124 at the end thereof which mesh with teeth 122 provided in the armature 92,94.

In utilization of the parking brake, the pilot actuates the coils 88,90 to bring the pressure plate 84 into forceful frictional contacting engagement with the brake disk stack. At this point in time, the pilot energizes the coil 116 to force the plunger 120 into contacting engagement with the aramature 92,94. At this point in time, the teeth 122,124 engage with each other and brake pedal force may be released. With the release of the brake pedal, the coils 88,90 are deenergized and the armature 92,94 attempts to rotate under the urging of the spring 106. However, the interengagement of the teeth 122,124 prevents such rotation and, accordingly, the pressure plate 84 is held into braking engagement with the stack. The coil can, at that time, also be deenergized.

To release the parking brake, the pilot need merely energize the coils 88,90, making a very slightly rotation or urging of the armature 92,94 which releases the clamped engagement of the teeth 122,124 with the plunger 120 thus dropping back to the solenoid housing 114. Release of pedal pressure then allows the retraction of the drive rod 100 a distance equivalent to the built-in clearance.

Figure 3:
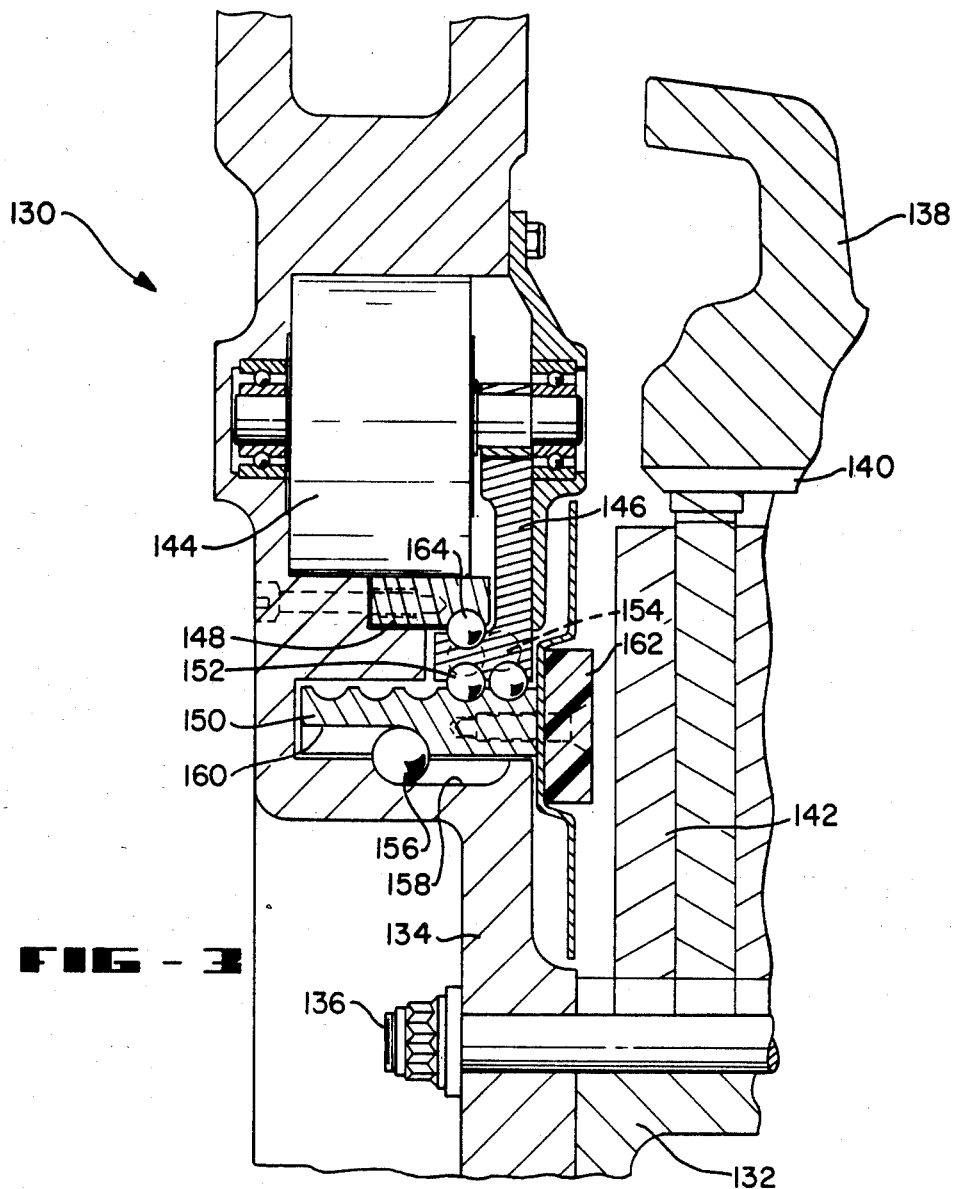
FIG. 3 is a partial sectional view of a brake assembly utilizing a third embodiment of the invention incorporating a plurality of torque motors driving a bull gear.

As shown in FIG. 3, a wheel assembly utilizing a third embodiment of the invention is designated generally by the numeral 130. Again, a torque tube 132 securedly maintains the brake housing 134 by means of bolts 136. The wheel rim 138 is provided in standard fashion for receipt of the tire, and keys 140 are provided for securing alternate disks of the brake disk stack. The disks of the stack are functional to provide a braking action under forceful engagement imparted by the pressure plate 142.

A plurality of torque motors 144, only one being shown in FIG. 3, are provided in circumferential spaced relationship about the wheel axle. The torque motors 144 are controlled by brake pedal actuation by the pilot, as earlier discussed, to drive a bull gear 146. A thrust ring 148 is provided for maintaining the bull gear in proper alignment.

A ball screw 150 is provided in driven engagement with the bull gear 146. A plurality of balls 152 are received by the ball screw 150 and intercommunicate with the bull gear 146. The passageway 154 is provided through the bull gear 146 to function as a ball return. It will be noted that the passageway 154 also passes through the thrust ring 148 such that the balls, passing through the passageway 154 act as a thrust bearing. As shown in FIG. 3, the ball 164 is in a thrust bearing position.

An antirotational ball 156 is maintained between the groove 160 of the ball screw 150 and the channel 158 maintained in the brake housing 134. The ball 156 keeps the ball screw 150 from rotating while allowing the same to move longitudinally. As provided in the other embodiments, there is also presented an insulating ring 162 for contacting the pressure plate 142.

In operation, the pilot suitably provides a signal to the torque motors 144 of an amplitude corresponding to the amount of brake pressure to be applied. This signal causes the torque motor 144 to rotate the bull gear 146. As a consequence of this rotation, the ball screw 150 is driven outwardly, driving the pressure plate 142 into contacting engagement with the brake disk stack. As the pilot releases brake pedal pressure, the torque motors 144 reverse their rotational direction accordingly to return the ball screw 150. The reverse drive of the torque motors 144 is limited to an amount equivalent to the built-in clearance and, with the bull gear 146 being freely rotatable, there is provided continual adjustment for brake wear while maintaining a constant built-in clearance.

Figure 4:
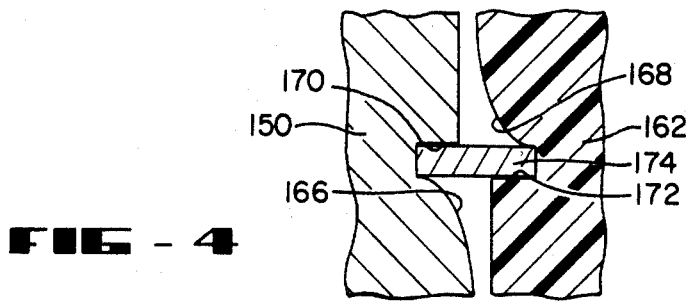
FIG. 4 is a sectional view of the quick release mechanism used for interconnection between the brake control apparatus and the pressure plate to achieve near instantaneous relaxation of braking efforts.

It is most desirable that the embodiments shown in FIGS. 1-3 be functional for use in aircraft incorporating antiskid systems. Such systems generally require very rapid response times between an electrical signal directing the release of brake application and the actual mechanical release. To achieve the desired instantaneous release, the structure of FIG. 4 is provided. The structure of FIG. 4 is shown with respect to the embodiment of FIG. 3, but it will be understood that the same is easily adaptable to any of the other embodiments. As shown, the ball screw 150 is characterized by an inclined or ramped surface 166 as is a diametrically opposed area of the insulating ring 162, designated by the numeral 168. Similarly, the ball screw 150 and insulating ring 162 are characterized by respective diametrically opposed surfaces 170,172 which are normal to the face surfaces of the associated elements 150,162. The surfaces 166-172 provide therebetween a receptacle for receiving therein a metal bar 174.

In the operation of the structure of FIG. 4, when the torque motors 144 begin to rotate, there is a very slight rotation of the ball screw 150, notwithstanding the provision of the balls 156. This rotation is in the direction of the arrow as shown in FIG. 4 and forces the bar 174 to take the elongated position as shown, resting against the square sides 170,172, and at square bottom sections of the recesses. Immediately upon release of brake pedal pressure, the ball screw 150 makes a very slight rotation in the direction opposite to the arrow shown, and the bar 174 drops against the ramped or inclined areas 166,168. This dropping allows the pressure plate 162 to instantaneously draw closer to the ball screw 150, with the result being instantaneous release of brake pressure. When the torque motors 144 are again energized. The slight rotation of ball screw 150 again brings the metal bar 174 into the position shown in FIG. 4 for immediate reapplication of braking effort.

Thus it can be seen that there has been presented electrically actuated aircraft brake assemblies which are characterized by the aspects set forth hereinabove. While in accordance with the patent statutes only the best modes and preferred embodiments of the invention have been presented and described in detail, it is to be understood that the invention is not limited thereto or thereby. For an appreciation of the true scope and breadth of the invention, reference should be had to the following claims.

What is claimed is:

1. In a brake assembly comprising a brake disk stack and a pressure plate in communication with the stack, the improvement comprising:
    reciprocating means connected to the pressure plate for selectively moving the pressure plate into and out of forceful contacting engagement with the brake disk stack;
    electrically controlled rotation means operatively interconnected with said reciprocating means, regulated by an operator, for selective control of said reciprocating means and regulation of said forceful contacting engagement;
    said rotation means comprising a coil in operative engagement with an armature, energization of said coil rotating said armature;
    said armature including a ball screw, said ball screw being in engagement with a drive rod operatively connected to the pressure plate; and
    adjustment means connected to said armature for rotating said armature a fixed amount in a direction opposite to that of the rotation caused by energization of said coil upon termination of said energization.

2. The improvement according to claim 1 wherein said adjustment means comprises a spring connected to said armature by a friction slip joint.

3. The improvement according to claim 1 which further includes a solenoid having a plunger in selective engagement with said armature for restricting rotational movement of said armature.

4. A brake control assembly for incorporation with a pressure plate and a brake disk stack, comprising:
    an armature;
    an electric coil rotationally driving said armature;
    a drive rod in communication with said armature and connected to the pressure plate, energization of said electric coil moving said drive rod to move the pressure plate;
    said armature including a ball screw, said ball screw being interconnected with said drive rod;
    said drive rod and ball screw communicating through a plurality of balls, said drive rod having a return passage therein moving said balls progressively along said ball screw; and
    return means connected to said armature for rotating said armature a particular amount in a direction opposite that of the rotation driven by said electric coil.

5. The brake control assembly according to claim 4 wherein said return means comprises a spring connected by a slip joint to said armature.

6. The brake control assembly according to claim 4 which further includes locking means in selective interengagement with said armature for restricting rotation thereof.

7. The brake control assembly according to claim 6 wherein said locking means comprises a coil and a plunger operative as a solenoid, said plunger engaging said armature upon energization of said coil.

8. The brake control assembly according to claim 7 wherein said plunger has teeth at an end thereof for meshing engagement with teeth in said armature.

* * * * *